United States Patent
Choudhary et al.

(10) Patent No.: US 7,650,401 B2
(45) Date of Patent: Jan. 19, 2010

(54) MANAGING INTROSPECTABLE OBJECTS IN AN ENTERPRISE

(75) Inventors: Samar Choudhary, Morrisville, NC (US); Naveenkumar V Muguda, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/168,442

(22) Filed: Jul. 7, 2008

(65) Prior Publication Data
US 2008/0270592 A1    Oct. 30, 2008

Related U.S. Application Data

(63) Continuation of application No. 10/835,878, filed on Apr. 30, 2004, now Pat. No. 7,464,149.

(51) Int. Cl.
*G06F 15/173* (2006.01)
(52) U.S. Cl. .......................... 709/223; 709/203
(58) Field of Classification Search .................. 709/203, 709/217, 219, 223
See application file for complete search history.

(56) References Cited

U.S. PATENT DOCUMENTS

| | | | |
|---|---|---|---|
| 6,023,271 A | 2/2000 | Quaeler-Bock et al. | 345/335 |
| 6,061,721 A * | 5/2000 | Ismael et al. | 709/223 |
| 6,275,790 B1 | 8/2001 | Yamamoto et al. | 704/8 |
| 2002/0095524 A1 | 7/2002 | Sanghvi et al. | 709/318 |
| 2002/0165996 A1 | 11/2002 | Hrebejk et al. | 709/316 |
| 2003/0018832 A1 | 1/2003 | Amirisetty et al. | 709/328 |
| 2003/0088576 A1 | 5/2003 | Hattori et al. | 707/103 R |
| 2003/0093575 A1 | 5/2003 | Upton | 709/310 |
| 2003/0135657 A1 * | 7/2003 | Barker et al. | 709/310 |
| 2003/0159130 A1 | 8/2003 | Broussard et al. | 717/120 |
| 2003/0163439 A1 | 8/2003 | Hankin et al. | 707/1 |
| 2003/0172088 A1 | 9/2003 | Mandal et al. | 707/200 |
| 2003/0188039 A1 | 10/2003 | Liu et al. | 709/328 |
| 2004/0249940 A1 | 12/2004 | Sohn et al. | 709/225 |

\* cited by examiner

*Primary Examiner*—Frantz B Jean
(74) *Attorney, Agent, or Firm*—VanLeeuwen & VanLeeuwen

(57) ABSTRACT

Managing object relationships in an enterprise is presented. A request manager receives a view request from a user. The request manager retrieves a management definition object (MDO) and a perspective that corresponds to the view request, which the request manager uses to generate a view that includes nodes corresponding to an enterprise's objects. The user analyzes the generated view, and sends a command request to the request manager that corresponds to a plurality of the nodes. The request manager uses the retrieved perspective, the MDO, and also may access a backend in order to identify objects that correspond to the command request. Once the objects are identified, the command manager sends a command to the identified objects to the backend through plug-ins.

15 Claims, 10 Drawing Sheets

```
<perspective>
    <node>                                                    ⸺ 410
            <class>Class_Organization</class>         ⸺ 415
            <constraint>Constraint_Organization</constraint>
            <node>
                    <role-name>clusters</role-name>   ⸺ 420
                    <constraint>null</constraint>      ⸺ 425

<node>                             ⸺ 430
                            <transparent_node>          ⸺ 440
                                    <role-name>subnets</role-name>
                                    <constraint>Constraint_subnet</
constraint>                                                     ⸺ 445
                            </transparent_node>         ⸺ 450
                            <role-name>machines</role-name>  ⸺ 460
                            <constraint>null</constraint>     ⸺ 465

</node>
            </node>
            <node>
                    <role-name>departments</role-name>   ⸺ 470
                    <constraint>null</constraint>
                    <node>                               ⸺ 475  ⸺ 480
                            <role-name>employees</role-name>   ⸺ 485
                            <constraint>constraint_employees</constraint>
                    </node>
            </node>
    </node>
</perspective>
```

*Figure 4*

```
<?xml version='1.0' encoding="UTF-8"?>
<!ELEMENT class
    (#PCDATA)
>
<!ELEMENT constraint
    (#PCDATA)
>
<!ELEMENT node
    (((transparent_node*,role-name,constraint)|(class,constraint)), node* )
>
<!ELEMENT perspective
    (node)
>
<!ELEMENT role-name
    (#PCDATA)
>
<!ELEMENT transparent_node
    (role-name,constraint)
>
```

500 — (figure callouts: 510, 520, 525, 530, 540, 550, 560, 570, 580, 590)

Figure 5

MANAGING INTROSPECTABLE OBJECTS IN AN ENTERPRISE

This application is a continuation application of co-pending U.S. Non-Provisional patent application Ser. No. 10/835,878, entitled "System and Method for Managing Introspectable Objects in an Enterprise," filed on Apr. 30, 2004.

BACKGROUND OF THE INVENTION

1. Technical Field

The present invention relates in general to a system and method for managing introspectable objects in an enterprise. More particularly, the present invention relates to a system and method for using perspectives and one or more managed definition objects (MDO's) in order to generate a particular view and process command requests and policies that correspond to the view.

2. Description of the Related Art

Enterprise administration has become more and more complex due to an enterprise's increasing size. An enterprise may include a multitude of components such as machines, drivers, applications, services, and processes. Each of these components may be designed to interface with a particular management system or console, which results in an overwhelming administration task. In an effort to alleviate some of the complexity of managing an enterprise, the Distributed Management Task Force (DMTF) introduced the Common Information Model (CIM) to standardize the representation of these components. The CIM model allows a user to describe a component in a manner that is not bound to a particular implementation or platform.

With the multitude of components that an enterprise may include, a user may wish to analyze the enterprise using particular views. For example, a user may wish to view the enterprise in a topology tree structure which first sorts the machines, based upon clusters, and then into subnets. A challenge found, however, is that a user is typically limited to viewing an enterprise based upon structures that are hard-coded into the managing console.

In addition, a user may wish to execute particular commands upon a plurality of components. For example, a user may wish to perform the command "show log files" to each component that corresponds to a particular subnet. In another example, a user may wish to "renew IP addresses of each machine in all subnets in all clusters of an organization." A challenge found is that the user is required to select and execute the command for each component on an individual basis, which may be time consuming and monotonous.

Additionally a user is not able to intuitively define rules that specify how to respond to particular events that a console notifies. For example, if a user observes that a certain machine is infected with a virus, the user may disconnect the machine. In addition, the user may wish to perform the same procedure on each machine that the user manages.

What is needed, therefore, is a system and method to provide a user with a plurality of enterprise views and, in turn, process a user's multi-component command requests based upon the user's selected view.

SUMMARY

It has been discovered that the aforementioned challenges are resolved by using "softwires" which abstract physically unrelated and unconnected objects into logical node trees, peer nodes, and peer trees, such that common events, rules, and actions are defined. In turn, multi-component command requests are processed based upon a particular rendered view.

A user uses a console to manage various computer system components. The user sends a view request to the console, which requests the console to display nodes in a particular manner. The request manager receives the view request, and retrieves a perspective that includes softwires. In addition, the request manager retrieves a management definition object (MDO) that includes a class hierarchy with class relations, such as associations and instance information corresponding to various classes. The request manager uses the perspective and the MDO to generate and display a view.

The user analyzes the view, and decides to perform a command to a plurality of nodes (i.e. all nodes in a sub tree). The user sends a command request to the request manager that, in turn, uses the perspective and the MDO to identify objects corresponding to the command. The request manager uses the perspective to identify classes that correspond to the nodes, and uses the MDO to identify classes and objects that correspond to the nodes.

Once the request manager identifies the objects that correspond to the command request, the request manager sends a command to the computer system. The computer system performs the commands on the identified objects. Once the user is finished sending command requests that correspond to a particular view, the user may send additional view requests to the console in order to generate different views using different perspectives.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 4 is an example of a perspective that includes a transparent node for creating a "softwire" between classes;

FIG. 5 is an example of a document type definition that defines elements that are used in conjunction with a perspective;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
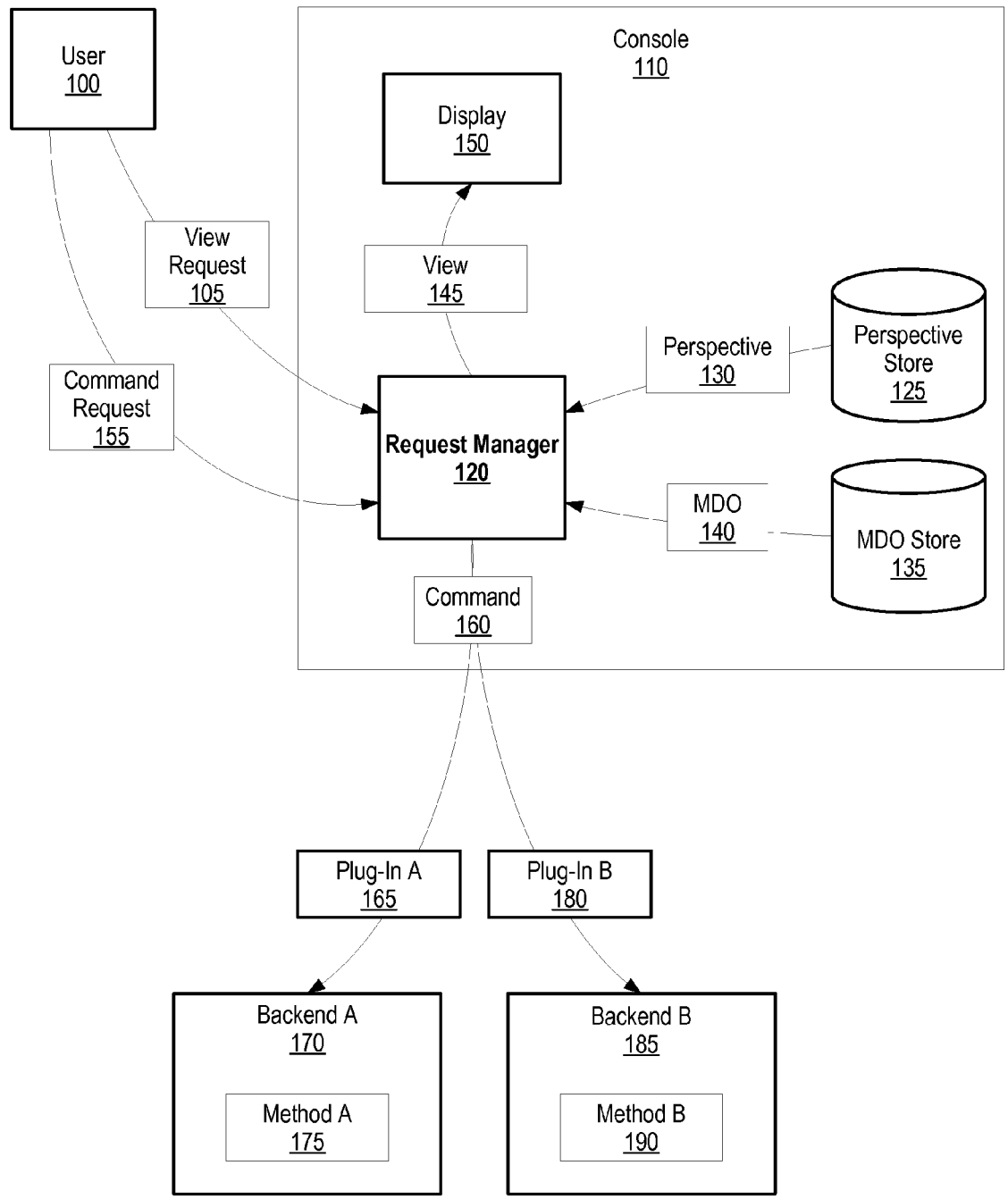
FIG. 1 is a diagram showing a console generating views that correspond to a user's request and processing command requests that correspond to the generated view.

FIG. 1 is a diagram showing a console generating views that correspond to a user's request and processing command requests that correspond to the generated view. User 100 uses console 110 to manage various computer system components, such as those located on backend A 170 and backend B 185. Console 110 uses request manager 120 for processing view requests and command requests it receives from user 100.

User 100 sends view request 105 to console 110. View request 105 requests console 110 to display nodes in a particular manner, such as a particular tree structure. For example, user 100 may wish to view objects included in his computer system in a manner corresponding to a structure of objects of class A at the topmost level, objects of class B at the next level and objects of class C at the lower most level. Request manager 120 receives view request 105, and retrieves perspective 130 from perspective store 125. Perspective 130 describes how nodes in a particular view are rendered and includes softwires between particular nodes (see FIG. 4 and corresponding text for further details regarding perspective details). Request manager 120 also retrieves management definition object (MDO) 140 from MDO store 135, which may be in a standard managed object format (MOF). MDO 140 includes a class hierarchy, which includes class relations like associations and instance information about various classes. Perspective store 125 and MDO store 135 may be stored on a nonvolatile storage area, such as a computer hard drive. Request manager 120 uses perspective 130 and MDO 140 to generate and display view 145 on display 150 (see FIG. 7 and corresponding text for further details regarding view generation). In one embodiment, request manager 120 may retrieve more than one MDO from MDO store 130 in order to generate a view.

User 100 analyzes view 145 on display 150, and decides to perform a command, such as "show log files, to a plurality of nodes. User 100 sends command request 155 to request manager 120, which, in turn, uses perspective 130 and MDO 140 to identify objects corresponding to the command. In one embodiment, request manager 120 accesses backend A 170 and/or backend B 185 to identify objects that correspond to the identified class types (see FIG. 8 and corresponding text for further details regarding object identification).

Once request manager 120 identifies the objects that correspond to command request 155, request manager 120 sends command 160 to backend A 170 and backend B 185 through plug-in A 165 and plug-in B 180, respectively. Backend A 170 receives command 160 and invokes command 160 on method A 175 which corresponds to one of the identified objects. Likewise, backend B 180 receives command 160 and invokes command 160 on method B 185. Once user 100 is finished sending command requests corresponding to view 145, user 100 may send additional view requests to console 110 in order to generate a different view using a different perspective.

Figure 2A:
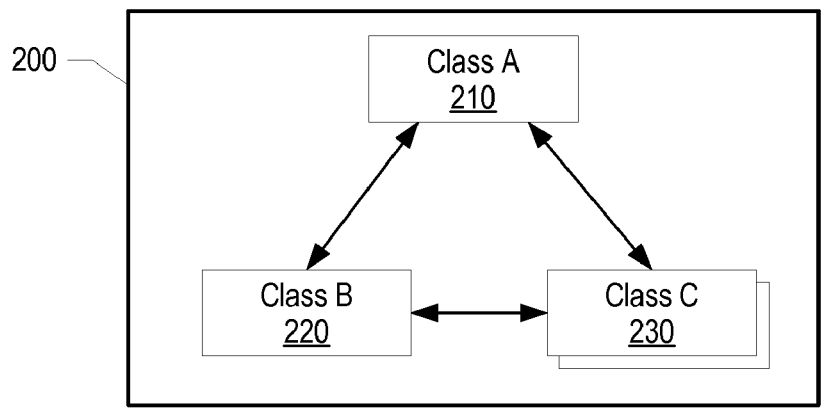
FIG. 2A is a diagram showing a visual representation of a class hierarchy structure.

FIG. 2A is a diagram showing a visual representation of a class hierarchy structure. Window 200 shows three classes, which are class A 210, class B 220, and class C 230. Both class A 210 and class B 220 have a single corresponding instance, while class C 230 has two corresponding instances. Window 200 shows that each class is associated with the other classes. For example, class A 210 is associated with class B 220 and class C 230. Class B 220 is associated with class A 210 and class C 230. And, class C 230 is associated with class A 210 and class B 220. A managed definition object (MDO) includes a class hierarchy like that shown in FIG. 2A which is used to generate views and process command requests.

Figure 2B:
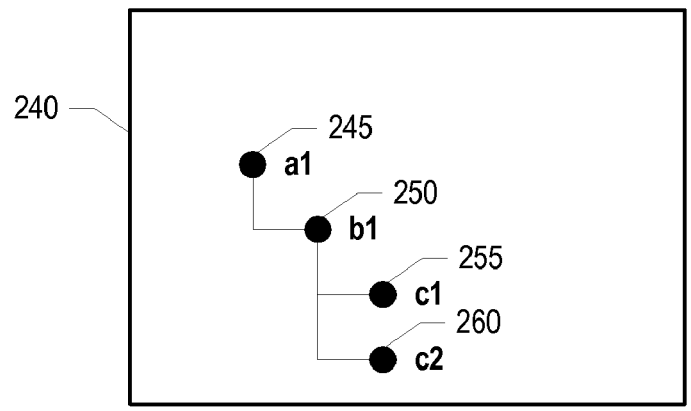
FIG. 2B is a diagram showing a view that corresponds to a first perspective.

FIG. 2B is a diagram showing a view that corresponds to a first perspective. Window 240 includes a view that is generated using a perspective that identifies a root class and describes other classes in terms of "role names" With respect to its "parent" in the navigation tree. The perspective includes "softwires" which generates views and omits objects that correspond to particular classes that are identified though the role name with respect to the classes in previous levels. In FIG. 2B, a1 245 is a root node that corresponds to class A 210 shown in FIG. 2A. B1 250 is a node that corresponds to class B 220 shown in FIG. 2A. C1 255 and c2 260 are nodes that correspond to class C 230 shown in FIG. 2A.

The view shown in window 240 is created using a perspective corresponding to softwires of "class A->class B->class C" whereby instances of class C are grouped under instances of class B, and instances of class B are grouped under instances of class A. Therefore, c1 255 and c2 260 are grouped under b1 250, and b1 250 is grouped under a1 245.

Figure 2C:
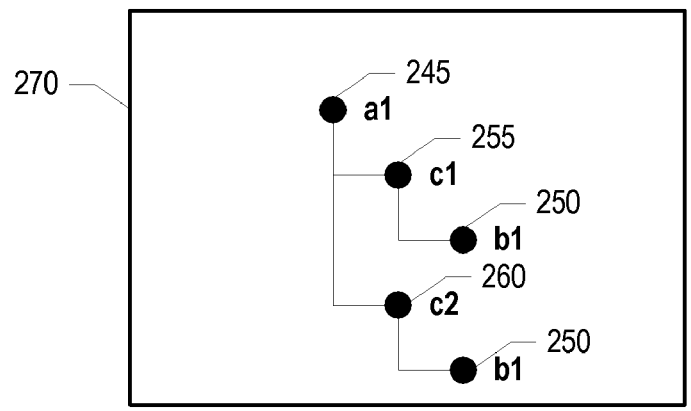
FIG. 2C is a diagram showing a view that is generated using a second perspective.

FIG. 2C is a diagram showing a view that is generated using a second perspective. The view in window 240 is created using a perspective correspond to softwires of "class A->class C->class B" whereby instances of class B are grouped under instances of class C, and instances of class C are grouped under instances of class A. Therefore, b1 250 is grouped under c1 255 and c2 250, and c1 255 and c2 260 are grouped under a1 245.

Figure 3:
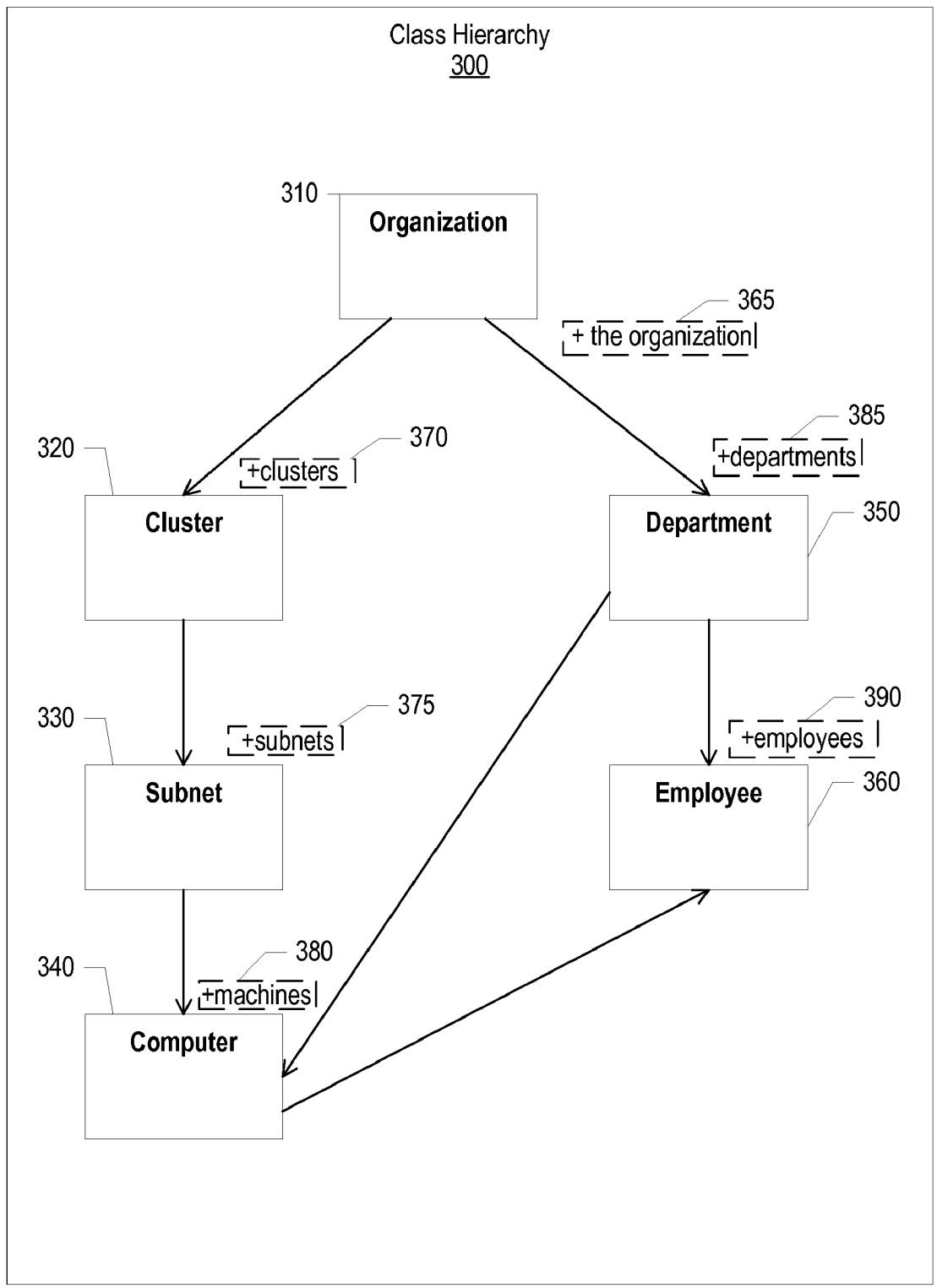
FIG. 3 is a diagram showing a visual representation of a class hierarchy.

FIG. 3 is a diagram showing a class model. Class hierarchy 300 includes classes 310 through 360. Role names are displayed for some of the classes in their corresponding associations (i.e. role names 365 through 390). The associations are used to create softwires in a perspective such that objects associated with particular classes are displayed accordingly (see FIG. 4 and corresponding text for further details regarding softwires).

Class 310's name is "Organization" and has a corresponding role name "the organization" (role name 365) in its association with the class "cluster". Class 310 has two related classes, which are class 320 and class 350. Class 320's name is "cluster" and has a corresponding role name "clusters" (role name 370) in its association with the class "organization". Class 320 has one class which is class 330. Class 330's name is "subnet" and has a corresponding role name "subnets" (role name 375) in its association with class "cluster". Class 330 also has one class which is class 340. Class 340's name is "computer" and has a corresponding role name "machines" (role name 380) in its association with the class "subnet".

Class 310's other related class's name, class 350, is "department" and has a corresponding role name "departments" (role name 385) in its association with the class "organization". Class 350 has two classes which are class 340 and class 360. Class 360's name is "employee" and has a corresponding role name "employees" (role name 390) in its association with the class "department". Each of the role names may be used in as a transparent role in order to "mask" objects that correspond to a particular class (see FIG. 4 and corresponding text for further details regarding a perspective that corresponds to class hierarchy 300).

FIG. 4 is an example of a perspective that includes a transparent node for creating a "softwire" between classes. The example shown in FIG. 4 is presented in an XML language. As one skilled in the art can appreciate, other languages may be used to define a perspective.

Perspective 400 includes lines 410 through 485 that are related to a particular class hierarchy, such as that shown in FIG. 3. Line 410 identifies a class "Organization" which is at the root level of perspective 400 and corresponds to class 310 that is shown in FIG. 3. Line 415 includes a constraint identifier for the class "Organization" which may be specified in a separate file (i.e. a company's name). Line 420 identifies a role name "clusters" which corresponds to class 320, which is a related to the class "Organization" as shown in FIG. 3. Line 425 shows that no constraints are placed upon the role name "clusters" (i.e. all instances of the clusters that are related to the selected instances of the organization will be displayed).

Line 430 starts the definition of a transparent node. The transparent node provides perspective 400 a softwire between two classes and, when used to generate a view, the view omits objects that correspond to the transparent node. Line 440 shows that the transparent node has a role name "subnets" in its association with the cluster class, which corresponds to class 330 as shown in FIG. 3. Line 445 includes a constraint identifier corresponding to the role name "subnets" and line 450 ends the definition of the transparent node.

Line 460 identifies a role name "machines" which corresponds to class 340, which is a child of the class "subnet" as shown in FIG. 3. Line 465 shows that no constraints are placed upon the role name "machines." Line 470 identifies a role name "departments" which corresponds to class 350 as shown in FIG. 3. Line 475 shows that no constraints are placed upon the role name "departments." Line 480 identifies a role name "employees" which corresponds to class 360, which is shown in FIG. 3. Line 485 identifies a constraint identifier that corresponds to the role name "employees." When a view is generated using perspective 400, objects corresponding to the class "subnets" are not displayed. Instead, objects corresponding to the class "clusters" are linked to objects corresponding to the class "machines." In one embodiment, the perspective definition may include super classes whereby the nodes displayed in a view may be instances of sub-classes.

FIG. 5 is an example of a document type definition that defines elements that are used to define a perspective, such as that shown in FIG. 4. Lines 510 and 520 define elements that are a "class" and a "constraint" which are widely known in the art. Line 525 defines an element "node" with properties that are included in line 530. Line 530 shows "(transparent_node*, role-name, constraint)" which means that a "node" may include zero or more transparent nodes, have a corresponding role name, and have corresponding constraints. Line 530 also shows "(class, constraint)" which means that a node may also be a class with constraints. In one embodiment, root nodes correspond to classes with constraints, while other nodes (i.e. children, grandchildren, etc.) correspond to role names relative to their parent in the perspective.

Line 540 defines an element "perspective" with properties of "node" (line 550) that correspond to line 525. Line 560 defines the element "role-name" used in line 530 with properties of a character string (line 570). Line 580 defines the element "transparent_node" used in line 530 with properties of "role-name" with constraints as shown in line 590.

As one skilled in the art can appreciate, other forms of a DTD may be generated in order to support the invention described herein.

Figure 6:
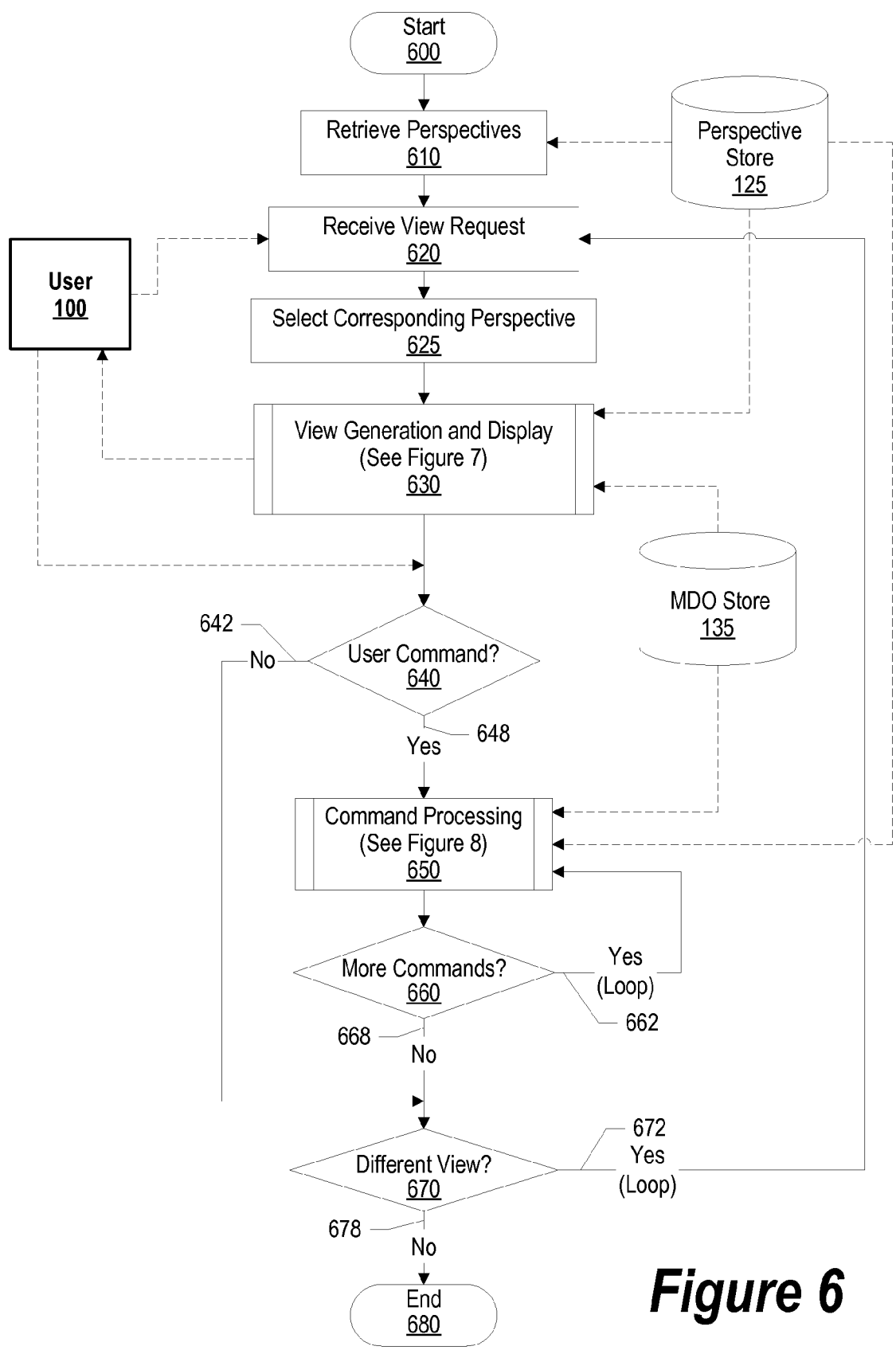
FIG. 6 is a high level flow chart showing steps taken in generating a view and processing a user's command request.

FIG. 6 is a high level flow chart showing steps taken in generating a view and processing a user's command request. Processing generates a view based upon a user's view request. In turn, the user observes the view and sends a command request. Processing identifies objects that correspond to the command request, and executes a command upon the identified objects.

Processing commences at 600, whereupon processing retrieves perspectives from perspective store 125. A perspective includes nodes that are "soft wired" together using role name specifications, such as with transparent nodes (see FIG. 4 and corresponding text for further details regarding soft wires). Perspective store 125 is the same as that shown in FIG. 1 and may be stored on a nonvolatile storage area, such as a computer hard drive.

Processing receives a view request from user 100 at step 620. The view request corresponds to a particular perspective which is used to generate a view. Processing selects the corresponding perspective (step 625), and generates a view to correspond to user 100's request by using the selected perspective as well as a management definition object (MDO) that is located in MDO store 135 (pre-defined process block 630, see FIG. 7 and corresponding text for further details). A management definition object includes information about relationships, role names, classes, and objects. For example, an MDO might describe a role name "cluster" as a class "cluster" with corresponding objects c1 and c2. MDO store 135 is the same as that shown in FIG. 1 and may be stored on a nonvolatile storage area, such as a computer hard drive.

User 100 analyzes the displayed view, and a determination is made as to whether the user wishes to execute a command on particular nodes (decision 640). If the user does not wish to perform a command, decision 640 branches to "No" branch 642 bypassing command processing steps. On the other hand, if the user wishes to perform a command, decision 640 branches to "Yes" branch 648 whereupon the user's command request is processed (pre-defined process block 650, see FIG. 8 and corresponding text for further details).

A determination is made as to whether the user wishes to perform more commands based upon the currently displayed view (decision 660). If the user wishes to perform more commands, decision 660 branches to "Yes" branch 662 which loops back to process the user's request. This looping continues until user 100 does not wish to perform more command requests based upon the currently displayed view, at which point decision 660 branches to "No" branch 668.

A determination is made as to whether user 100 wishes to analyze a different view (decision 670). For example, user 100 may wish to view objects in a different tree structure. If user 100 wishes to observe a different view, decision 670 branches to "Yes" branch 672 which loops back to receive and process another view request. This looping continues until user 100 does not wish to observe more views, at which point decision 670 branches to "No" branch 678 whereupon processing ends at 680.

Figure 7:
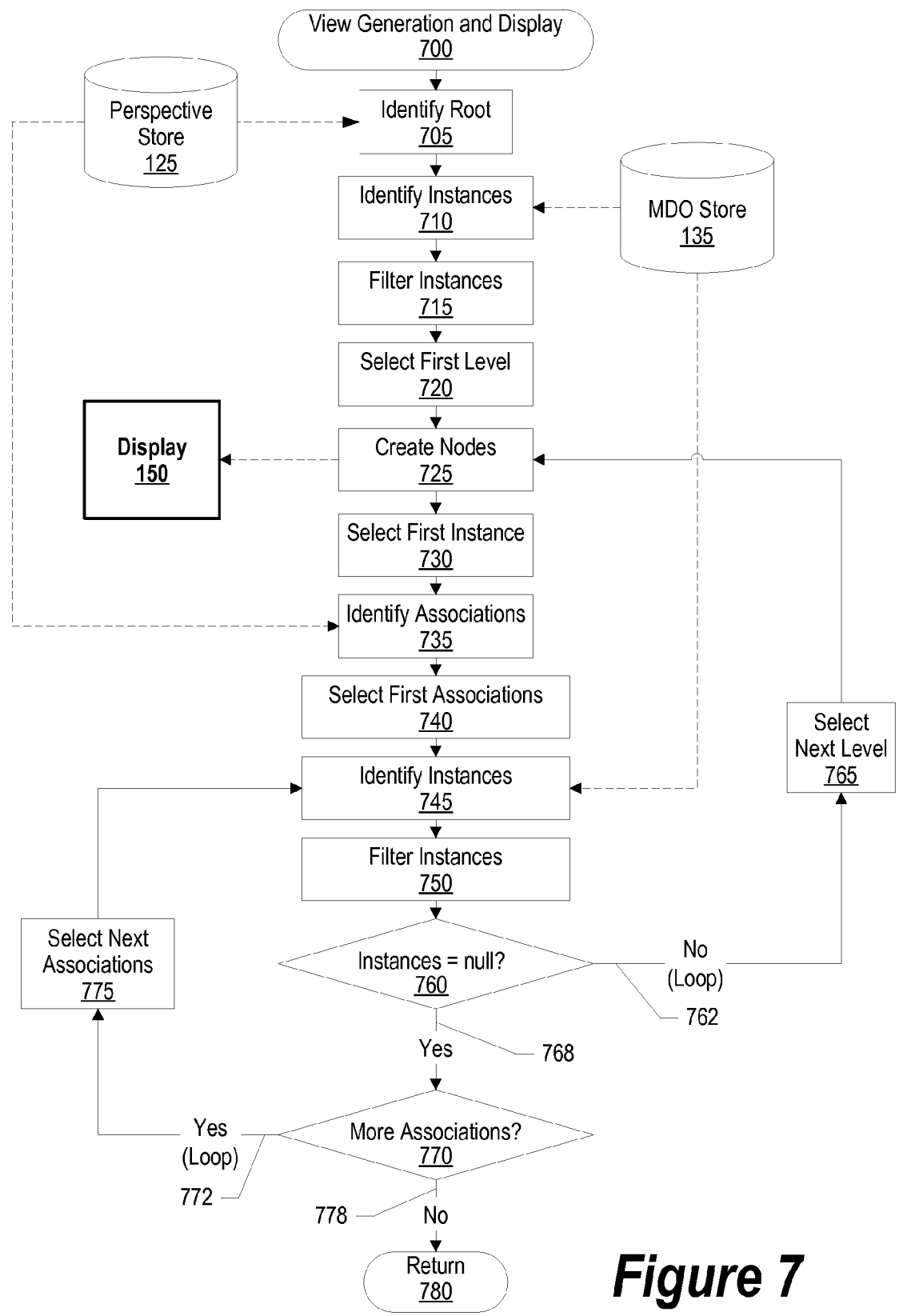
FIG. 7 is a flowchart showing steps taken in generating and displaying a particular view.

FIG. 7 is a flowchart showing steps taken in generating and displaying a particular view. For example, a user may wish to view objects corresponding to a structure such as "class A->class D->class E". Processing commences at 700, whereupon processing identifies a root corresponding to the user's request using a perspective located in perspective store 125. Processing identifies instances of the root at step 710 by accessing an MDO in MDO store 135. In one embodiment, processing accesses a backend to identify instances, such as backend 170 and backend 185 which are shown in FIG. 1. Perspective store 125 and MDO store 130 are the same as that shown in FIG. 1 and may be stored on a nonvolatile storage area, such as a computer hard drive.

At step 715, processing uses constraints to filter the identified instances. For example, "department name=ABC" is a filter that removes all departments other than department "ABC." Processing selects a first level at step 720, and, at step 725, creates nodes that correspond to the filtered instances and displays the nodes on display 150. Display 150 is the same as that shown in FIG. 1.

Processing selects the first instance included in the first level at step 730. At step 735, processing identifies associations of the first instance by using the perspective located in perspective store 125. Processing selects the first association of the first instance at step 740, and identifies instances of the first association using the MDO located in MDO store 135 (step 745). At step 750, processing uses constraints to filter the identified instances.

A determination is made as to whether there are any instances that remain after the filtering step (decision 760). If there are instances, decision 760 branches to "Yes" branch 762 whereupon processing selects (step 765) and processes the next level. This looping continues until there are no more instances to process, at which point decision 760 branches to "No" branch 768.

A determination is made as to whether there are more associations that correspond to the identified instances (decision 770). If there are more associations, decision 770 branches to "Yes" branch 772 whereupon processing selects (step 775) and processes the next association. This looping continues until there are no more associations, at which point decision 770 branches to "No" branch 778 whereupon processing returns at 780.

Figure 8:
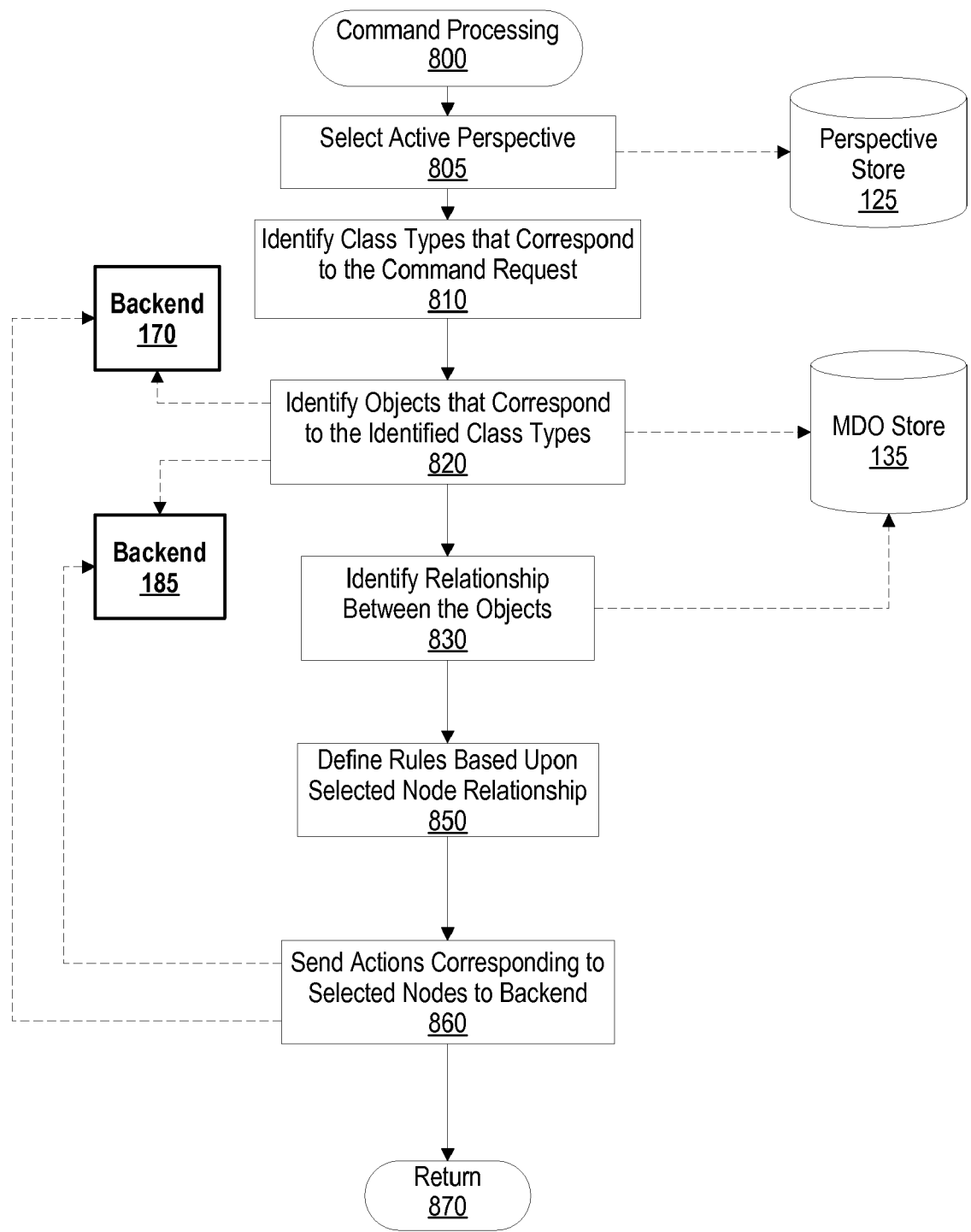
FIG. 8 is a flowchart showing steps taken in processing a user's command request.

FIG. 8 is a flowchart showing steps taken in processing a user's command request. Processing commences at 800, whereupon processing selects a perspective that corresponds to a user's selected view at step 805 (see FIG. 7 and corresponding text for further details regarding view generation). The perspective is located in perspective store 125 which is the same as that shown in FIG. 1, and may be stored on a nonvolatile storage area, such as a computer hard drive.

Processing uses the perspective to identify role names that correspond to the command request (step 810). For example, the command request may correspond to all nodes "x" whereby processing identifies the role name that correspond to the nodes "x." At step 820, processing uses a management definition object (MDO) located in MDO store 135, as well as accessing backend 170 and backend 185, to identify classes and objects that correspond to the identified role names. MDO store 135, backend 170, and backend 185 may be stored on a nonvolatile storage area, such as a computer hard drive. In one embodiment, a constraint may be associated with each class that filters out some of the instances of the class. For example, "organization name=ABC" is a filter that removes all organizations other than company "ABC."

Processing identifies relationships between the selected objects using the MDO stored at step 830. For example, processing identifies which nodes are children, grandchildren, etc. of a particular root node. Processing defines rules based upon the identified node relationship at step 850.

At step 860, processing sends actions that correspond to the command request to backend 170 and 185. The command requests may pass through plug-ins such as those shown in FIG. 1. Processing returns at 870.

Figure 9:
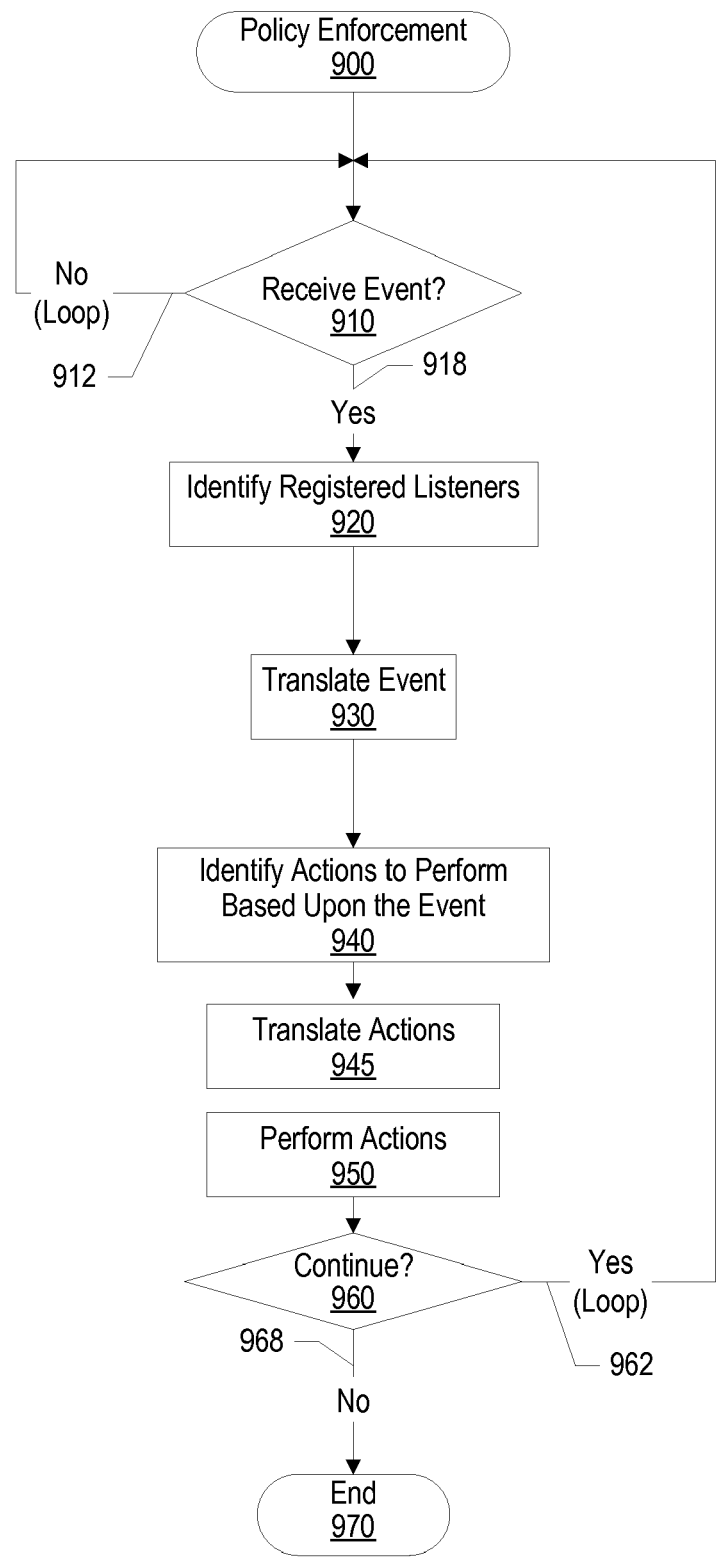
FIG. 9 is a flowchart showing steps taken in enforcing policies for a particular event.

FIG. 9 is a flowchart showing steps taken in enforcing policies for a particular event or a combination of events. For example, policies may be of the form "If event E occurs in node n perform action A on node n's parent (in the navigation view)" or of the form "if event E occurs in any children (in the navigation view) of node n then perform action A on node n".

An algorithm corresponding to the flowchart shown in FIG. 9 may be encoded in controllers, which are associated with nodes on a navigation tree. Rules are defined relative to one of the nodes of the view that is rendered to the user. Policy definition and enforcement aspects help the user define policies, which enables the user to automatically perform particular actions. In addition, high-level rules may be defined and enforced which cannot be performed on a per unit basis.

Processing commences at 900, whereupon a determination is made as to whether an event is received (decision 910). For example, if a policy is "if virus found in any machine, update virus definition for all machines present in the subnet as the infected machine", which may be stored in the form "if Event (VIRUS_FOUND, ?x), where ?x in children of ?subnet, then for all ?y in children(?subnet) do ?y.ReloadVirus Definition( ). Using this example, suppose nodes n11, n12 and n13 are present in subnet s1, and nodes n21, n22 and n23 are present in subnet s2. In this example, an event may be received that signifies that a virus is detected in node n11. In addition, one of the registered listeners of this event may be a controller, which has a reference to the parent node of s1 and s2. If an event is not received, decision 910 branches to "No" branch 912 which loops back to continue to wait for an event. This looping continues until an event is received, at which point decision 910 branches to "Yes" branch 918 whereupon processing identifies a class associated with the event (step 920).

Processing translates the event at step 930. Using the example described above, the virus found in n11 translates to event found in a machine of the subnet s11. In other words, Event(VIRUS_FOUND, n11) instantiates the variable ?x and the condition part of the rule mentioned in the above mentioned policy is checked. At step 940, processing identifies one or more actions to perform based upon the received event. Using the example described above, the action of "update virus definition" is invoked upon all children of s1, such as n11, n12 and n13. Processing performs the identified actions on the identified classes at step 960. At step 945, processing translates the actions and performs the actions at step 950.

A determination is made as to whether to continue policy enforcement (decision 960). If policy enforcement should continue, decision 960 branches to "Yes" branch 962 whereupon processing loops back to receive and process more events. This looping continues until policy enforcement should terminate, at which point decision 960 branches to "No" branch 968 whereupon processing ends at 970.

Figure 10:
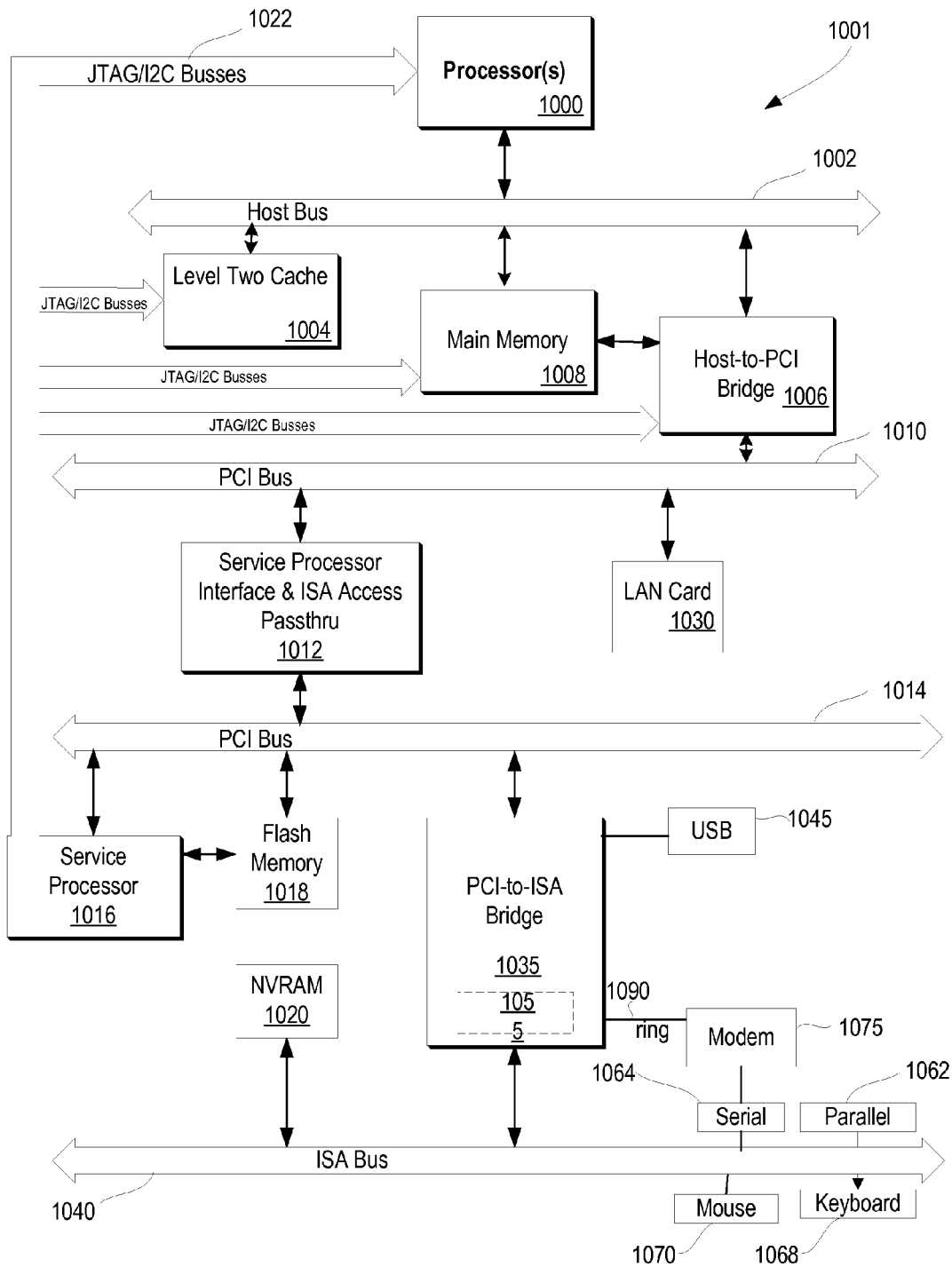
FIG. 10 is a block diagram of an information handling system capable of implementing the present invention.

FIG. 10 illustrates information handling system 1001 which is a simplified example of a computer system capable of performing the computing operations described herein. Computer system 1001 includes processor 1000 which is coupled to host bus 1002. A level two (L2) cache memory 1004 is also coupled to host bus 1002. Host-to-PCI bridge 1006 is coupled to main memory 1008, includes cache memory and main memory control functions, and provides bus control to handle transfers among PCI bus 1010, processor 1000, L2 cache 1004, main memory 1008, and host bus 1002. Main memory 1008 is coupled to Host-to-PCI bridge 1006 as well as host bus 1002. Devices used solely by host processor(s) 1000, such as LAN card 1030, are coupled to PCI bus 1010. Service Processor Interface and ISA Access Pass-through 1012 provides an interface between PCI bus 1010 and PCI bus 1014. In this manner, PCI bus 1014 is insulated from PCI bus 1010. Devices, such as flash memory 1018, are coupled to PCI bus 1014. In one implementation, flash memory 1018 includes BIOS code that incorporates the necessary processor executable code for a variety of low-level system functions and system boot functions.

PCI bus 1014 provides an interface for a variety of devices that are shared by host processor(s) 1000 and Service Processor 1016 including, for example, flash memory 1018. PCI-to-ISA bridge 1035 provides bus control to handle transfers between PCI bus 1014 and ISA bus 1040, universal serial bus (USB) functionality 1045, power management functionality 1055, and can include other functional elements not shown, such as a real-time clock (RTC), DMA control, interrupt support, and system management bus support. Nonvolatile RAM 1020 is attached to ISA Bus 1040. Service Processor 1016 includes JTAG and I2C busses 1022 for communication with processor(s) 1000 during initialization steps. JTAG/I2C busses 1022 are also coupled to L2 cache 1004, Host-to-PCI bridge 1006, and main memory 1008 providing a communications path between the processor, the Service Processor, the L2 cache, the Host-to-PCI bridge, and the main memory. Service Processor 1016 also has access to system power resources for powering down information handling device 1001.

Peripheral devices and input/output (I/O) devices can be attached to various interfaces (e.g., parallel interface 1062, serial interface 1064, keyboard interface 1068, and mouse interface 1070 coupled to ISA bus 1040. Alternatively, many I/O devices can be accommodated by a super I/O controller (not shown) attached to ISA bus 1040.

In order to attach computer system 1001 to another computer system to copy files over a network, LAN card 1030 is coupled to PCI bus 1010. Similarly, to connect computer system 1001 to an ISP to connect to the Internet using a telephone line connection, modem 1075 is connected to serial port 1064 and PCI-to-ISA Bridge 1035.

While the computer system described in FIG. 10 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
receiving a view request, the view request corresponding to a plurality of nodes;
selecting a perspective, from a plurality of perspectives, wherein each of the plurality of perspectives corresponds to a different view, and wherein the selected perspective corresponds to the view request;
identifying a root node and a transparent node that are included in the selected perspective;
determining one or more role names that correspond to the plurality of nodes using the selected perspective;
identifying one or more classes that correspond to the role names, each of the classes corresponding to a plurality of objects;
retrieving one or more managed definition objects, the managed definition objects including a relationship between the identified classes and the plurality of objects;
identifying one or more child nodes that correspond to the root node using one of the managed definition objects and the selected perspective;
associating the identified classes to the plurality of objects using the managed definition object; and
displaying the root node and identified child nodes in an active view, wherein the objects that correspond to the transparent node are omitted from the active view.

2. The method of claim 1 further comprising:
receiving a subsequent view request, the subsequent view request corresponding to a subsequent perspective;
selecting the subsequent perspective from the plurality of perspectives; and
displaying a subsequent view that corresponds to the subsequent perspective, the subsequent view different than the view.

3. The method of claim 1 wherein the view is a common aggregated depiction of an enterprise.

4. The method of claim 1 further comprising:
receiving an event, the event corresponding to one of the identified classes;
identifying one or more actions corresponding to the event; and
performing the identified actions on the class that corresponds to the event.

5. The method as described in claim 1 further comprising sending a command request to the plurality of objects that correspond to the identified classes, wherein the command request is sent to the plurality of objects using a plurality of plug-ins.

6. An information handling system comprising:
one or more processors;
a memory accessible by the processors;
one or more nonvolatile storage devices accessible by the processors; and
an object management tool for managing introspectable objects, the object management tool comprising software code effective to:
  receive a view request over a computer network, the view request corresponding to a plurality of nodes;
  retrieve a perspective from a plurality of perspectives stored in one of the nonvolatile storage devices, wherein each of the plurality of perspectives corresponds to a different view and wherein the retrieved perspective corresponds to the view request;
  identify a root node and a transparent node that are included in the perspective;
  determine one or more role names that correspond to the plurality of nodes using the perspective;
  identify one or more classes that correspond to the role names, each of the classes corresponding to a plurality of objects;
  retrieve one or more managed definition objects from one of the nonvolatile storage devices, the managed definition objects including a relationship between the identified classes and the plurality of objects;
  identify one or more child nodes that correspond to the root note using one of the managed definition objects and the perspective;
  associate the identified classes to the plurality of objects using the managed definition objects; and
  display the root node and the identified child nodes in an active view, wherein objects that correspond to the transparent node are omitted from the active view.

7. The information handling system of claim 6 wherein the software code is further effective to:
  receive a subsequent view request over the computer network, the subsequent view request corresponding to a subsequent perspective;
  select the subsequent perspective from the plurality of perspectives; and
  display a subsequent view that corresponds to the subsequent perspective, the subsequent view different than the view.

8. The information handling system of claim 6 wherein the view is a common aggregated depiction of an enterprise.

9. The information handling system of claim 6 wherein the software code is further effective to:
  receive an event over the computer network, the event corresponding to one of the identified classes;
  identify one or more actions corresponding to the event; and
  perform the identified actions on the class that corresponds to the event.

10. The information handling system as described in claim 6 wherein the software code is further effective to send a command request to the plurality of objects that correspond to the identified classes, wherein the command request is sent to the plurality of objects using a plurality of plug-ins.

11. A program product comprising:
computer operable storage medium having computer program code, the computer program code being effective to:
  receive a view request, the view request corresponding to a plurality of nodes;
  retrieve a perspective, from a plurality of perspectives, wherein each of the plurality of perspectives corresponds to a different view, and wherein the retrieved perspective corresponds to the view request;
  identify a root node and a transparent node that are included in the perspective;
  determine one or more role names that correspond to the plurality of nodes using the perspective;
  identify one or more classes that correspond to the role names, each of the classes corresponding to a plurality of objects;
  retrieve one or more managed definition objects, the managed definition objects including a relationship between the identified classes and the plurality of objects; identify one or more child nodes that correspond to the root note using one of the managed definition objects and the perspective;
  associate the identified classes to the plurality of objects using the managed definition objects; and
  display the root node and the identified child nodes in an active view, wherein objects that correspond to the transparent node are omitted from the active view.

12. The program product of claim 11 wherein the computer program code is further effective to:
  receive a subsequent view request, the subsequent view request corresponding to a subsequent perspective;
  select the subsequent perspective from the plurality of perspectives; and
  display a subsequent view that corresponds to the subsequent perspective, the subsequent view different than the view.

13. The program product of claim 11 wherein the view is a common aggregated depiction of an enterprise.

14. The program product of claim 11 wherein the computer program code is further effective to:
  receive an event, the event corresponding to one of the identified classes;
  identify one or more actions corresponding to the event; and
  perform the identified actions on the class that corresponds to the event.

15. The program product as described in claim 11 wherein the software code is further effective to send a command request to the plurality of objects that correspond to the identified classes, and wherein the command request is sent to the plurality of objects using a plurality of plug-ins.

* * * * *